United States Patent [19]

Lekmine et al.

[11] Patent Number: 5,359,606
[45] Date of Patent: Oct. 25, 1994

[54] DATA QUALITY ANALYSIS IN A DATA SIGNAL PROCESSING CHANNEL

[75] Inventors: Brahim Lekmine, Denver; Donald L. Millican, Westminster; Joe K. Jurneke, Brighton, all of Colo.

[73] Assignee: Storage Technology Corporation, Louisville, Colo.

[21] Appl. No.: 834,600

[22] Filed: Feb. 12, 1992

[51] Int. Cl.$^5$ .......................................... H03M 13/00
[52] U.S. Cl. .......................................... 371/6; 341/132; 375/75
[58] Field of Search ............... 371/6, 43; 341/118, 341/132, 126; 307/350, 355, 360; 328/115; 375/75

[56] References Cited

U.S. PATENT DOCUMENTS

| | | |
|---|---|---|
| 4,051,473 | 9/1977 | Hooker, Jr. . |
| 4,100,531 | 7/1978 | Kobayaski et al. . |
| 4,841,232 | 6/1989 | Graham et al. ........................ 371/6 |
| 4,918,262 | 4/1990 | Flowers et al. ..................... 340/718 |
| 4,945,538 | 7/1990 | Patel ..................................... 371/43 |
| 4,965,800 | 10/1990 | Farnbach ............................... 371/6 |
| 5,243,605 | 9/1993 | Lekmine et al. ...................... 371/43 |

OTHER PUBLICATIONS

Jonathan S. Abel 'Restoring a clipped signal' IEEE Jul. 1991 pp. 1745–1748.

*Primary Examiner*—Robert W. Beausoliel, Jr.
*Assistant Examiner*—Albert Decady
*Attorney, Agent, or Firm*—Sheridan Ross & McIntosh

[57] ABSTRACT

A data channel monitor is provided for a data channel that converts analog signal data to binary digital bits. The monitor allows the quality of the data detected to be measured in conjunction with predetermined processing steps performed in the data channel. The channel monitor obtains channel data and uses the data to determine detection margins, which are a measure of the data quality. The detection margins are compared with an acceptable value(s). Error references are generated if a detection margin is outside an acceptable range. The data monitor also preferably includes a diagnostic capability wherein all detection margins may be stored for off-line analysis whenever the data channel is placed in diagnostic mode.

27 Claims, 3 Drawing Sheets

DATA QUALITY ANALYSIS IN A DATA SIGNAL PROCESSING CHANNEL

FIELD OF THE INVENTION

The present invention is directed to determining values relating to the quality of data being detected in a data channel preferably for use in enhancing the accuracy of detected data.

BACKGROUND OF THE INVENTION

The accurate detection of data is an important aspect of utilizing data stored on a medium. If the data channel responsible for detecting the binary data stored on a storage medium, such as a magnetic tape or disk, cannot accurately detect and output an accurate binary digital equivalent, then the digital system that is to utilize such data is severely handicapped. In general, incorrect and/or inefficient channel detection of binary data stored on media can be due to a number of factors including media defects, hardware/software data channel processing errors, and/or improper setting of channel parameters.

With regard to media defects, these can cause signal drop-ins or drop-outs that may affect the accuracy of binary data detection. Since binary ones are typically associated with high amplitude analog signal portions and zeros with low amplitude analog signal portions, media defects may cause binary values that ought to be detected as binary zeros to be inaccurately detected as binary ones (i.e. drop-in). Conversely, media defects may cause binary ones to be inaccurately detected as binary zeros (i.e. drop-out). Signal drop-outs can occur regularly on magnetic tapes. Thus, if the data channel includes a magnetic tape drive, even "good tapes" can have 10–20% of the information on the tape associated with signal drop-outs.

In the latter two cases, i.e. channel errors and parameter settings, substantial costs are incurred in determining channel performance bottlenecks and anomalies during development, manufacturing and, in particular, once a channel is installed at a customer site. For example, if the data channel includes a magnetic tape drive, it is costly to determine appropriate drive parameter settings to reach a balance between overly accurate data detection where too many re-analyses and read retry requests are generated, and potentially inaccurate data detection where detection errors are not flagged for re-analyses and/or re-read. If the balance is too far in the direction of the former, the channel will be overly slow. If, on-the-other hand, it is too far in the direction of the latter, it will be inaccurate. This balance may be especially costly when the settings must be made on drives located at a customer site. Also, it is crucial from a customer's perspective to identify and solve problems before any data is lost or the data channel decoding rate is greatly slowed by read retries.

Diagnosing channel performance problems, such as those above, effectively and efficiently has been elusive. It would be advantageous to have highly efficient channel evaluator techniques that sample the channel data at one or more steps during channel signal processing and output the necessary information that would allow further analysis, such as when detection accuracy is in question or when channel diagnostics are being executed. The present invention derives its novelty from the use of such channel evaluators, denoted "detection margins," which measure the quality of the data detection. Such detection margins can be obtained during normal operation of the data channel or during diagnostic testing. During normal operation only those portions of the channel data that have a relatively high probability of being erroneous are flagged for subsequent analysis. By placing the channel in a diagnostic mode and attempting to detect binary data on a medium designed to contain diagnostic data, the detection margins can be used to construct a model of the channel. By analyzing the model and its behavior, channel bottlenecks can be identified and corrective action can be taken.

SUMMARY OF THE INVENTION

The present invention relates to a method and apparatus for monitoring or measuring the accuracy of data detection in a data processing channel such that recovery, error, and/or diagnostic information can be generated. Such information is typically generated when channel data accuracy measurements are outside of a predetermined acceptable range or when channel diagnostic information is requested.

The monitoring of data accuracy is achieved using determined values identified as "detection margins." As described below, detection margins are determined using predetermined channel parameter values including preferably, digital sample voltage values and tracking threshold values.

Two embodiments using detection margins have been devised. In a first embodiment, the detection margins are determined before the detection of the states of the binary bits being inputted to a detection module. The detection module is the hardware and/or software in the data processing channel that detects the binary states corresponding to digital voltage signal samples. An example of such a module is described in U.S. patent application Ser. No. 728,719, filed on Jul. 11, 1991, now U.S. Pat. No. 5,243,605, and entitled "Modified Viterbi Detector With Run-Length Code Constraint" and assigned to the same assignee as the present invention. Such detection modules can be sensitive to signal anomalies such as signal drop-outs and noise. Thus, the determination of detection margins at or near the detection of the binary states can increase the accuracy of the channel by obtaining information that can be used to initiate alternative data analysis procedures whenever data detection problems are indicated by the values of the detection margins.

The magnitudes of the detection margins that are determined prior to the detection of the binary bits using the detection module measure or indicate the quality of the voltage signal samples that are being inputted to the detection module. Each signal sample to be inputted to the detection module is first evaluated by determining a detection margin using a voltage value associated with the signal sample and a determined tracking threshold. The tracking threshold is typically a function of the voltage values of a number of signal samples. The detection margin is compared with a predetermined quality threshold. If the detection margin is below this threshold for a signal sample, then reference information is generated that will cause re-analysis of the detected binary value outputted from the detection module that corresponds to this signal sample. If the detection margin is above the threshold, then no reference information is generated. In either case, if the channel is configured to be in diagnostic mode, then all detection margins are outputted to permanent storage.

Thus, the capability of analyzing the detection margins off-line is provided so that the data channel parameters, hardware and software can be adjusted to enhance channel performance. As an aside, this diagnostic feature has become important with regard to evaluating performance of a magnetic tape drive both during the manufacturing testing process and once the drive is installed at a customer site.

In a second embodiment, magnitudes of the detection margins are determined immediately after the detection module determines the binary state of the inputted binary bit. More precisely and preferably, the detection margin determination is done only when a binary one is outputted by the detection module. In that regard, the two voltage signal samples corresponding to the most recently detected binary one and the previously detected binary one that immediately preceded the most recent binary one are used to compute a detection margin for the sequence of binary values delimited by these binary ones. If the detection margin is below a predetermined threshold, then reference information is generated. If the detection margin is above the threshold, then no reference information is generated. In either case, if the channel is configured to be in diagnostic mode, then all determined detection margins are outputted to permanent storage.

Each detection margin determining embodiment includes the following features: 1) a data channel step, S, where the detection margins are determined; 2) a procedure associated with the sampling of channel data; 3) a formula or metric for computing detection margins; and 4) a range or value to which the computed detection margins are compared. Each one of these four features will be discussed in turn.

Each detection margin is designed to measure the quality of the channel data at a specific step associated with the data processing. A detection margin associated with one channel step may be quite different from a detection margin associated with a second channel step. The channel data sampling can be done in a number of ways. Since the channel processes data serially, data can be sampled at regular intervals according to sample order (e.g. every fourth sample), or according to time (e.g. one sample every millisecond). Alternatively, the sampling can be done according to the condition or value of the data in the channel. In the current determination of detection margins, sampling is done according to sample order and according to the value of the data in the channel. That is, in the detection margin determination prior to the detection module, every signal sample is analyzed, whereas in the detection margin determination after the detection module, only the channel data associated with detected binary ones is analyzed. The metric or formula by which a detection margin is determined is likely to be based on a heuristic, or rule of thumb, that balances the rigorousness of a guaranteed measure of data quality with the requirement for very high channel efficiency. Thus, substantial experimentation is involved in creating formulas that are both computationally simple and yet provide appropriate measures of channel data quality. The ranges by which the quality values are compared are also determined by experimentation. In the current embodiments, the ranges are programmable and therefore can be set according to the particular performance characteristics of a channel.

Based on the foregoing summary, a number of important features of the present invention are readily discerned. A data channel monitor is provided for determining values or detection margins that measure the data accuracy in a signal processing channel, The determined detection margins can be used on-line or off-line in evaluating and enhancing data integrity. Loss or reduction in use of the signal data processing channel can be reduced by means of the determined detection margins since they can be used to more rapidly identify and solve problems associated with data detection in a data channel.

Other features and benefits of the present invention will become apparent from the detailed description with the accompanying figures contained hereinafter.

DETAILED DESCRIPTION

Figure 1:
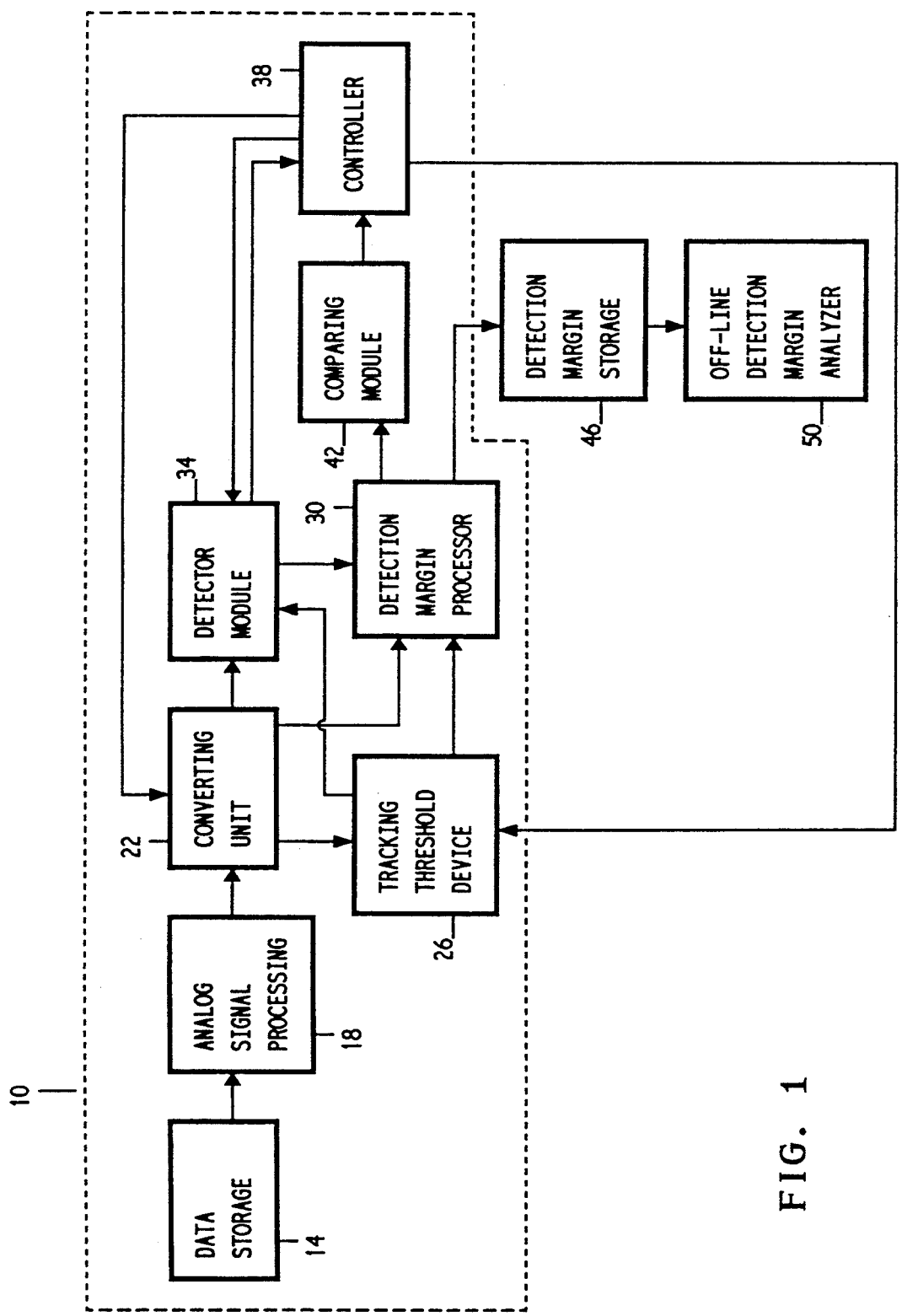
FIG. 1 is a block diagram of the present invention illustrating two embodiments for determining detection margins during signal data processing in a data channel.

With reference to FIG. 1, a preferred embodiment of a data channel 10 is presented that illustrates two different embodiments for determining detection margins. The data channel 10 includes a data storage device 14 such as a magnetic tape or disk. The data is typically stored on data storage device 14 in a predetermined encoding such as a run-length limited encoding of (0,3). The data on storage device 14 can be input, upon request, to the analog signal processing device 18. The input to processing device 18 is an analog signal representing the binary data on device 14. The analog signal processing device 18 essentially filters noise from the analog signal. In the current embodiment, the processing device 18 includes a full wave rectifier circuit which provides the capability for common mode rejection, a technique well known in the art. The output from the processing device 18 is inputted to a converting unit 22. The converting unit 22 first samples the inputted analog signal to obtain voltage samples. After sampling, the converting unit 22 determines which consecutive voltage samples should correspond to a "bit cell". Generally, in the current embodiment, every four overlapping consecutive samples constitute a bit cell. However, if certain predetermined patterns are detected in the voltage samples, bit shift compensation circuitry within the converting unit 22 reallocates voltage samples so that different voltage samples are associated with the bit cells. The converting unit 22 also prequalifies the bit cells by averaging the voltage samples within each bit cell to obtain a single digital voltage signal sample whose binary state is to be detected or decoded. The digital voltage signal samples from the converting unit 22 are then supplied as input to a tracking threshold device 26, a detection margin processor 30 and a detector module 34.

The detector module 34 detects the sequence of binary bits corresponding to the voltage signal samples received from the converting unit 22. The detector module 34 outputs the most likely binary state for each voltage signal sample input. The output from the detector module 34 is supplied to the detection margin processor 30 and also to a controller 38, as will be discussed below. In the current embodiment, the detector module 34 includes a Viterbi detector. More precisely, the current detector includes a Viterbi detector with a runlength encoding constraint. Briefly, binary bit detection by the detector module 34 is accomplished by analyzing the amplitude and polarity of each signal sample to determine its binary state. In doing the detection, subsequent signal inputs will be examined and an additional voltage value, denoted the external tracking threshold value, are utilized. The external tracking threshold allows the detector module 34 to distinguish the most recent high voltage amplitude samples from the most recent low voltage amplitude samples. Thus, sufficiently high input amplitudes of alternating polarity can be detected as binary ones, while all other signal samples are detected as zeros. The following Table sets out the metrics or equations for Viterbi detection:

TABLE

A. When looking for a positive transition:
 1. if $X \leq -E_{TT}$ then $V_p$ is detected as 1.
 2. if $X > 0$ then $V_p$ is detected as 0.
 3. if $-E_{TT} < X \leq 0$ then $V_K$ is detected as 0.
B. When looking for negative transition:
 1. if $X \geq E_{TT}$ then $V_p$ is detected as 1.
 2. if $X < 0$ then $V_p$ is detected as 0.
 3. if $0 \leq X < R_{TT}$ then $V_K$ is detected as 0.

$V_p$ is the present voltage signal sample whose binary value is to be detected; $V_K$ is the look-a-head voltage signal sample that is used in detecting the value of $V_p$; $E_{TT}$ is the external tracking threshold value referred to above; and $X = V_k - V_p$ is the amplitude difference between the present and look-a-head values.

There are two sets of similar metrics in the Table. The set (A) is used whenever the next binary one is represented by a positive voltage peak. The set (B) is used whenever the next binary one is represented by a negative voltage peak. Since peaks detected as binary ones must alternate in polarity, these two sets of metrics are alternately used depending on whether the next binary one must be of positive polarity, i.e. set (A), or negative polarity, i.e. set (B). Note that in equation (3) of each set the binary value of $V_P$ is not determined. Instead, the binary value of $V_K$ is specified. If this occurs, $V_K$ is subsequently assigned the next voltage signal sample following the current $V_K$. X is then recomputed and the same set of metrics is solved. In addition to the metrics set out in the Table, it is also advantageous to utilize algorithms associated with run-length limited encoding in the detection process to increase the accuracy of the detector, as explained the afore-identified Serial No. 728, 719.

The controller 38 typically obtains binary outputs from a plurality of detectors modules. In the embodiment where the data storage device 14 is a magnetic tape with nine data tracks, the controller 38 will simultaneously receive binary output from nine detector modules corresponding to nine data channels, one per data track. The controller 38 is essentially an error correction code device such that, whenever possible detection errors are suspected on some data channel, the controller 38 can modify the data channel producing the suspected errors, and/or cause the error prone portion of the storage device 14 to be re-read.

The tracking threshold device 26 computes (1) the above noted external tracking threshold value and (2) an internal tracking threshold value. These threshold values are used in distinguishing high amplitude signal samples from low amplitude samples. Generally, the internal tracking threshold is a value that is compared with the magnitude of the digital voltage sample outputted by the converting unit 22. Depending upon the result of the comparison, the magnitude of the digital voltage sample may be used in determining the external tracking threshold. The external tracking threshold is a value that is inputted to the detector module 34 and is used in detecting the binary state of the currently inputted digital voltage sample. The detector module 34 continuously receives an updated external tracking threshold value as an input from the tracking threshold device 26. The detection margin processor 30 receives both tracking thresholds as inputs as will be explained below. Preferably both tracking threshold values are computed from a running average of a predetermined number of the most recent high amplitude voltage signal samples input from the converting unit 22. That is, both tracking threshold values are percentage reductions of this running average. The percentages are denoted as the internal threshold reduction factor (ITR) associated with the internal tracking threshold value and the external threshold reduction factor (ETR) associated with the external tracking threshold value. The most recently computed internal tracking threshold value is the value with which newly inputted digital signal samples to device 26 have their amplitudes compared for determining if they are to be accepted into the running average. With each new running average computed, both tracking threshold values are recomputed. A tracking threshold device 26 is disclosed in U.S. patent application Ser. No. 07/834,648, filed Feb. 12, 1991, entitled "Digital Decoding Using Dynamically determined Tracking Threshold Values", now U.S. Pat. No. 5,298,901 and assigned to the same assignee as the present invention.

In the current embodiment, the detection margin processor 30 obtains signal samples from the converting unit 22 and the internal and external tracking threshold values from the tracking threshold device 26. The processor 30 determines detection margins using the two currently implemented detection margin related metrics. The first metric is associated with determining detection margins before detection of the binary bit, while the second metric is associated with determining detection margins after detection of the binary bit. Each detection margin provides an indication as to the quality of the data in the data channel 10 and the quality of data channel processing up to a predetermined step in channel 10. The pre-detection metric computations of detection margins result in measurements of the quality of the channel data processing immediately prior to the detector module 34. The post-detection metric computations of detection margins result in measurements of the quality of the channel data processing immediately after the detector module 34. Both of these metrics are discussed more fully in connection with FIGS. 2 and 3. The output from the processor 30 consists of the detection margin values. The outputs are supplied to comparing module 42 and a detection margin storage 46.

The comparing module 42 includes a comparator that compares each input detection margin with at least one quality threshold value. In the current embodiment, there are two sets of quality threshold values, one for the predetection metric and one for the post-detection metric. If a comparison indicates that a detection margin is outside of the acceptable range associated with the quality threshold value, then comparing module 42 generates error references to the sequence of binary value(s) outputted by the detector module 34 that relate to the particular detection margins that was just compared with the quality threshold value. Any generated error references are outputted to the controller 38 to determine appropriate corrective action.

The detection margin storage 46 stores the detection margins outputted by the detection margin processor 30. The detection margins are stored as a result of system personnel reconfiguring channel 10 to be in a diagnostic mode such that any channel performance bottlenecks can be determined. The stored detection margins can be supplied, upon request, to an off-line detection margin analyzer 50. The detection margin analyzer 50 is activated as a separate process from that of data channel 10. The analyzer 50 uses the inputted detection margins to create a model of data channel 10 that can used by system personnel to diagnose channel 10 bottlenecks and to predict the behavior of channel 10 under various data channel 10 parameter settings.

Returning to the controller 38, it is seen that the controller 38 obtains, from each data channel 10, both the detected binary values outputted by detector modules 34, and any error references to portions of these binary values whose detection margin is deficient and associated quality is therefore suspect. As mentioned above, the controller 38 can modify or control predetermined features of each data channel 10 in an attempt to reduce the number of error references obtained from each comparing module 42. More precisely, the controller 38 will attempt one or more of the following steps if error references occur on some channel 10:

a. A correction decoder within controller 38 can be activated which can correct detection errors on one data channel 10 by using the binary output from one or more other data channels 10.

b. If a data channel 10 produces too many suspected detection errors, then the controller 38 can attempt to reduce the number of further errors by modifying certain predetermined aspects of the data channel 10.

c. If, after manipulating the predetermined aspects, there are still too many suspected detection errors, then controller 38 can cause still more predetermined aspects of the data channel to be modified followed by a request to re-read the analog signal from data storage 10.

The arrows on FIG. 1 directed outward from controller 38 represent internal communication flows among the devices of a data channel 10 that correspond to the steps (a–c) above. The arrow from controller 38 to tracking threshold device 26 represents the communication flow which allows controller 38 to adjust the internal and/or external tracking threshold values by adjusting the internal and external threshold reduction factors. In the current embodiment, this adjustment is done in step (b). The arrows from controller 38 to converter 16 and from controller 38 to detector module 34 represent communication flows activated in step (c). The arrow to the converting unit 22 represents internal channel 10 communication flows that allow controller 38 to activate/deactivate the bit shift compensation circuitry within the converting unit 22; in particular, this circuitry is deactivated in step (c). The arrow to the detector module 34 represents internal channel 10 communication flows that allow controller 38 to activate/deactivate the run-length limited encoding correction circuitry; in step (c) this circuitry is activated.

Figure 2:
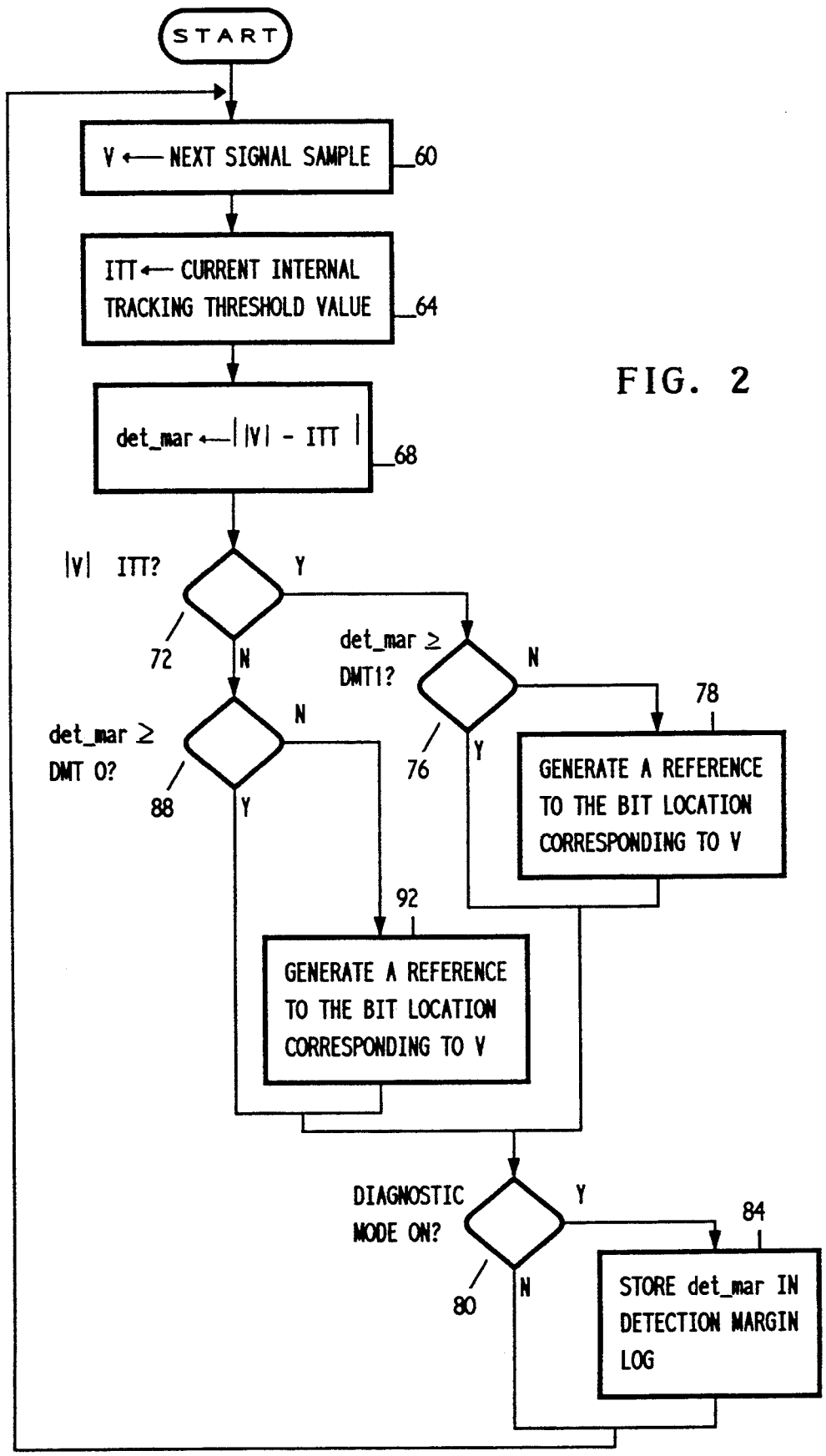
FIG. 2 is a flow diagram setting out steps associated with determining detection margins before the states of the binary bits are detected.

In discussing the determination of pre-detector detection margins, reference in made to FIG. 2. FIG. 2 presents one embodiment of steps utilized in the determination of the pre-detector detection margins. However, it should be noted that these steps are not necessarily executed using the same device. In the embodiment of FIG. 1, some steps of FIG. 2 are executed using the detection margin processor 30, comparing module 42 and detection margin storage 46. Initially, this detection margin algorithm is executed using the detection margin processor 30. In step 60 of FIG. 2, the pre-detector variable V is assigned the next (or first) signal sample output from the converting unit 22 to processor 30. In step 64 the pre-detector variable ITT is assigned to the current internal tracking threshold output from the tracking threshold device 26 to processor 30. In step 68 the processor 30 computes the pre-detector detection margin and assigns the value to the pre-detector variable, det_mar. The metric upon which the computation in step 68 is based is intended to provide a measure of the certainty that a signal sample will have its binary value clearly detected or determined. It has been empirically demonstrated that the wider the difference between a sample's amplitude and the internal tracking threshold, the more assurance can be had that the binary value for the sample will be clearly detected. Thus, there is more confidence in unambiguously detecting high amplitude signal samples as binary ones and low amplitude signal samples as binary zeros when there are larger differences between such voltage amplitudes and the internal tracking threshold value. With this in mind, in step 72, executed in processor 30, a determination is made as to whether the amplitude of the sample is greater than or equal to ITT. If so, then presumably the sample's amplitude is likely to be too high to be detected as a binary zero. Thus, in step 76, executed using the comparing module 42, a comparison is made to determine if the sample's amplitude is sufficiently high relative to the pre-detector quality threshold for binary ones detection, DMT1, to assume the sample will be detected correctly as a binary one. That is, if det_mar is greater than or equal to the predetermined value DMT1, then the assumption is that the sample will be detected correctly as a one and no corrective action need be taken. Alternatively, if det_mar is less than DMT1, then there is uncertainty as to the binary state of that binary bit. In this latter case, in step 78 the comparing module 42 stores sufficient information such that, when the current sample is inputted to the detector module 26 and a binary value detected, the comparing module 42 can generate an error reference pointing to the detected binary bit, and supply this reference to the controller 38 so that corrective action can be taken. In either case, step 80 is encountered next. As indicated in the description of FIG. 1, the data channel 10 can be placed in diagnostic mode by system personnel. In this mode all determined margin detection margins are captured for further off-line analysis. In step 80, executed in processor 30, a determination is made as to whether diagnostic mode is enabled. If so, then in step 84 the processor 30 stores the value of det_mar in the detection margin storage 46.

Following step 84, the next digital voltage signal sample is assigned to the pre-detector variable V. In step 64 the current internal tracking threshold is assigned to the pre-detector variable ITT. It should be noted that this value of ITT may or may not be the same as the previous value. If the current value of V (newly inputted digital sample) is sufficiently large, then it will have been used to compute new tracking threshold values (ITT and ETT). Encountering step 68 again, the processor 30 computes the next pre-detector detection margin and assigns the value to the pre-detector variable, det_mar. In step 72, if the amplitude of V is less than ITT, then the input sample is likely to be too low to be detected as a one. Therefore, the decision branch leading to step 88 is taken. In step 88, a determination is made as to whether the value of the detection margin det_mar is large enough so that error routines need not re-analyze the detected value of V outputted from the detector module 34. In step 88, executed using comparing module 42, det_mar is compared with a predetermined pre-detection threshold quality value for zeros, DMT0. The assumption here is the same as discussed for DMT1 above. That is, DMT0 is the minimum quality value that has been empirically demonstrated to be successful in distinguishing acceptable detection margin from unacceptable detection margins. If det_mar is greater than or equal to DMT0, then V has sufficiently low amplitude (in comparison to the internal tracking threshold) such that re-analysis of the detector module 34 output having the value of V is unnecessary. Conversely, if det_mar is less than DMT0, then in step 92, the comparing module 42 stores sufficient information such that, when the sample associated with the value V has had its binary value detected by the detector module 26, the comparing module 42 can generate an error reference to the detected value. This reference is supplied to the controller 38 so that corrective action can be taken. Regardless of what decision branch from step 88 is taken, step 88 is once again encountered to determine if the diagnostic mode is on. If so, then the value of det_mar is stored in the detection margin storage 46 as indicated above. Following this, the next signal sample is obtained in step 60, and the pre-detector detection margin algorithm is repeated.

Figure 3:
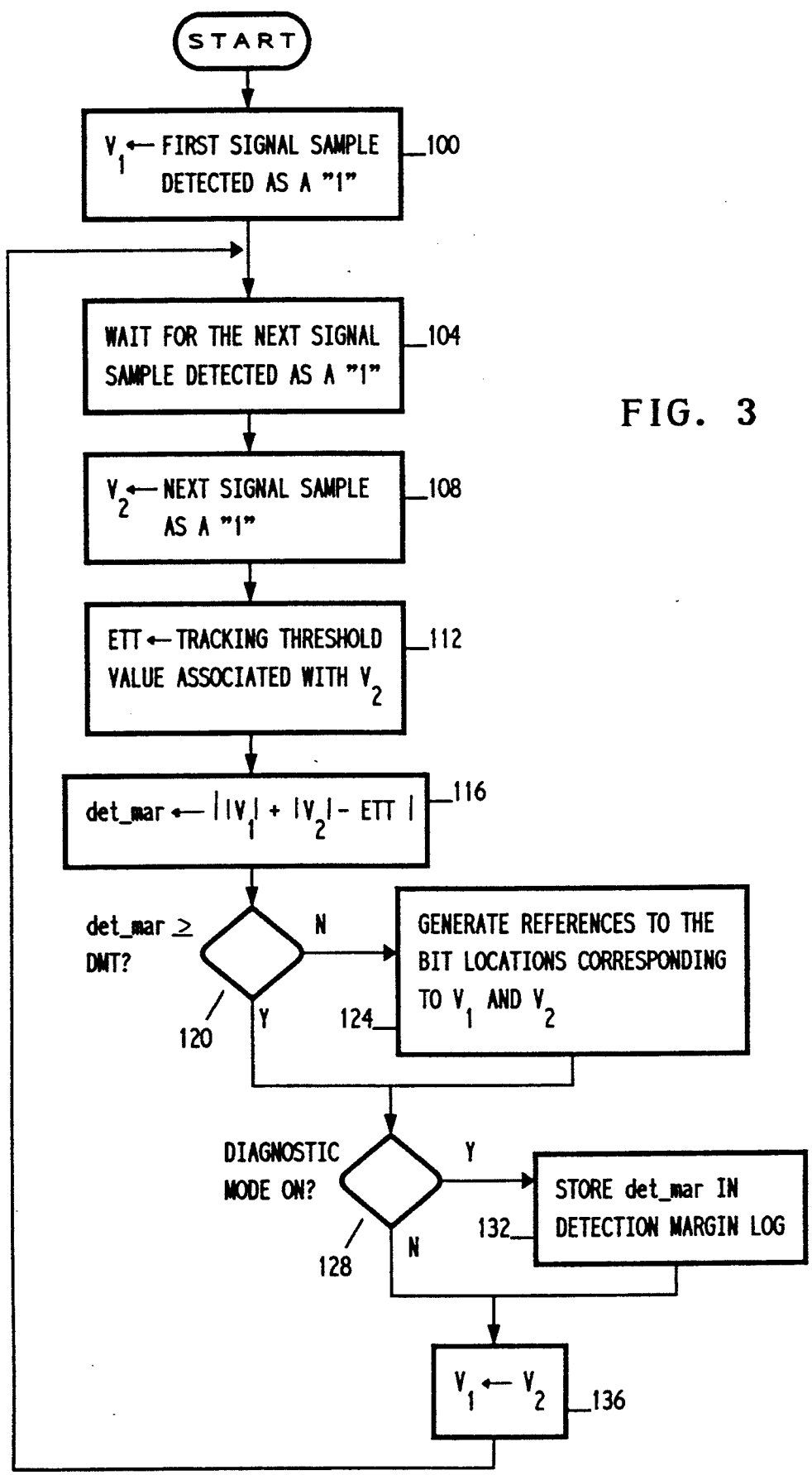
FIG. 3 is a flow diagram setting out steps associated with determining detection margins after the states of the binary bits are detected.

In FIG. 3 a representation of one embodiment for determining detection margins after the binary state of the inputted digital value is detected is illustrated. The quality of the channel data is measured or monitored immediately after the determination is made using the detector module 34. In accomplishing this, the signal samples and the external tracking threshold are supplied as inputs to the detector module 34. Briefly, this embodiment determines a detection margin based on two signal sample values, V1 and V2, inputted to the detector module 34, where both V1 and V2 have been detected as binary ones and where no inputs to the detector module 34 between these two samples have been detected as binary ones. If the determined detection margin is greater than or equal to a predetermined quality threshold value, empirically demonstrated as a minimum quality value, then no corrective actions need to be initiated. However, if the detection margin is less than this threshold, then, just as with the pre-detector embodiment discussed above, actions are scheduled to re-analyze the sequence of detected binary values between (and including) V1 and V2. It should also be noted that various steps of this algorithm are executed using detection margin processor 30, the comparing module 42 and the detection margin storage 46, in a manner similar to the determination of detection margin in the embodiment that uses samples before detection.

In greater detail, in step 100, which is an initialization step for the main loop of FIG. 3, the post-detector detection margin variable V1 is assigned the voltage value of the first signal sample that has been detected as a binary one. Step 104 waits for the next binary one to be detected by detector module 34. In step 108, the sample obtained in step 104, which is the next sample to be detected as a binary one, is assigned to the detection margin variable V2. In step 112, the value of the most recently computed external tracking threshold, supplied by tracking threshold device 26 to the processor 30, is assigned to the variable ETT. In step 116, processor 30 first computes the post-detector detection margin from the two signal samples, V1 and V2, and then assigns the detection margin to the post-detector variable, det_mar. The metric upon which the computation in step 116 is based is intended to provide a measure of the certainty that a signal sample has had its binary value accurately detected. It has been empirically demonstrated that the larger the value of det_mar, the more accurately the samples V1, V2, and those in between, have had their associated binary values correctly detected. In step 120, det_mar is compared against a predetermined threshold value, DMT, to determine whether the detection margin is sufficiently large such that no further analysis of the detected sequence associated with input samples from V1 to V2 need be done. If det_mar is less than DMT, then in step 124 the comparing module 42 stores sufficient information such that it can generate error references to the sequence of binary values, and subsequently supply these references to controller 38 so that corrective action(s) can be taken. Whichever decision branch is taken from step 120, decision step 128 will be encountered. Just as in the pre-detector algorithm of FIG. 2, data channel 10 can be placed in a diagnostic mode by system personnel such that the detection margins computed are also captured for further off-line analysis. Thus, in step 128, executed using processor 30, a determination is made as to whether the diagnostic mode is on. If so, then in step 132, the processor 30 stores the value of det_mar in detection margin storage 46. As a final step in preparation to looping back to wait for the next signal sample to be detected as a binary one in step 104, the value of V2 is assigned to V1 so that the next two binary ones trigger the next detection margin computation where the last pair of binary ones ended.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiment described hereinabove is further intended to explain the best mode presently known of practicing the invention and to enable others skilled in the art to utilize the invention in such, or other embodiments, and with the various modifications required by their particular applications or uses of the invention. It is intended that the appended claims to be construed to include alternative embodiments to the extent permitted by the prior art.

What is claimed is:

1. A method for monitoring the quality of data in a data signal processing channel, comprising:
obtaining pre-detected data including at least a first pre-detected data value;
ascertaining a first tracking threshold value;

detecting a first detected data value using said first pre-detected data value and said first tracking threshold value;

determining a first detection margin relating to data quality using said first tracking threshold value and one of said first pre-detected data value and said first detected data value, said first detection margin having a quantitative value and being determined as a function of a voltage amplitude of said one of said first pre-detected and said first detected data values, said first detection margin being correlated with said one of said first pre-detected and said first detected data values and said first detection margin being indicative of data quality of said one thereof.

2. A method as claimed in claim 1, wherein said first tracking threshold value is ascertained using said pre-detected data.

3. A method as claimed in claim 1, wherein said step of determining includes determining said first detection margin as a function of said first detected data value and a second detected data value, wherein said first and second detected data values have been successively detected as binary ones.

4. A method as claimed in claim 1, further including: using said first detection margin to cause a desired change in the operation of the data channel.

5. A method, as claimed in claim 4, wherein said step of using includes comparing said first detection margin with at least a first predetermined threshold value.

6. A method as claimed in claim 5, wherein said step of using further includes referencing at least one binary bit whenever said first detection margin is less than said first predetermined threshold value.

7. A method as claimed in claim 4, wherein said step of determining includes using a second detected data value, wherein each of said first and second detected data values has been detected as a binary one and there are no detected data values detected as binary ones received between said first and second detected data values.

8. A method as claimed in claim 7, wherein said step of using further includes generating a reference to a sequence of binary bits that are suspected of being detected incorrectly, said sequence relating to said binary bits between said first and second detected data values.

9. A method as claimed in claim 8, wherein said step of using includes:
re-evaluating said sequence of binary bits using detecting means that receives said pre-detected data in the data channel.

10. A method as claimed in claim 8, wherein said step of using includes at least one of the following:
changing said first tracking threshold value by changing a first threshold reduction factor; and
changing a second tracking threshold value by changing a second threshold reduction factor.

11. A method as claimed in claim 7, wherein said step of determining said first detection margin includes obtaining a magnitude relating to a sum of voltages associated with said first and second detected data values and taking a difference between said magnitude and said first tracking threshold value.

12. A method as claimed in claim 4, wherein said step of using includes at least one of the following:
activating a run-length encoding correction means: and
deactivating a bit shift compensation means.

13. A method as claimed in claim 4, wherein said step of using includes:
storing said first detection margin for off-line analysis of data channel performance; and
analyzing said stored first detection margin for use in enhancing data channel performance.

14. A method as claimed in claim 1, wherein said step of determining includes obtaining a difference between said voltage amplitude of said first pre-detected data value and said first tracking threshold value.

15. An apparatus for monitoring quality of data associated with a data signal processing channel, comprising:
first means for providing pre-detected data including a first pre-detected data value;
tracking threshold means for outputting at least a first tracking threshold value;
detection means for receiving pre-detected data and outputting detected data including a first detected data value;
second means, responsive to said first means, for determining at least a first detection margin relating to data quality using said first tracking threshold value and at least one of said first pre-detected data value and said first detected data value, said first detection margin having a quantitative value and being determined as a function of a voltage amplitude of said one of said first pre-detected data value and said first detected data value, said first detection margin being correlated with said one of said first pre-detected and said first detected data values and said first detection margin being indicative of data quality of said one thereof; and
third means, responsive to said second means, for using said first detection margin to cause a desired change in the operation of the data signal processing channel.

16. An apparatus, as claimed in claim 15, wherein: said first means includes:
data storage means for storing analog signal data to be processed using the data channel;
analog signal processing means for filtering noise from said analog signal data; and
converting means for converting said analog signal data to digital signal data.

17. An apparatus, as claimed in claim 16, wherein said data storage means includes at least one of the following: a magnetic tape, a magnetic disk, an optical disk and a data channel.

18. An apparatus, as claimed in claim 16, wherein: said analog signal processing means includes a full wave rectifier.

19. An apparatus, as claimed in claim 16, wherein said converting means includes bit shift compensation means.

20. An apparatus, as claimed in claim 15, wherein said second means includes detection means for detecting a binary state of pre-detected data inputted thereto.

21. An apparatus, as claimed in claim 20, wherein said second means includes processor means, responsive to said tracking threshold means, for computing said first detection margin using said first tracking threshold value and said voltage amplitude associated with said first pre-detected data value.

22. An apparatus, as claimed in claim 20, wherein said processor means computes said first detection margin using said first detected data value and a second detected data value wherein said first detected data value is detected as a binary one and said second detected data value is detected as a binary one and there are no detected data values detected as binary ones between said first and second detected data values.

23. An apparatus, as claimed in claim 15, wherein said first detection margin is determined using said voltage amplitude associated with said first pre-detected data value inputted to said second means.

24. An apparatus, as claimed in claim 15, wherein:
said third means compares said first detection margin with a first predetermined threshold value.

25. An apparatus, as claimed in claim 15, wherein said third means includes:
means for generating references to a sequence of binary bits outputted by said second means that are suspected of being incorrectly detected.

26. An apparatus, as claimed in claim 15, further including:
means for changing said first tracking threshold value by changing a first threshold reduction factor; and
means for modifying a second tracking threshold value by modifying a second tracking threshold reduction factor.

27. An apparatus, as claimed in claim 15, wherein said third means includes:
storage means for storing said first detection margin for off-line analysis of data channel performance; and
off-line analyzer means for analyzing said first detection margin stored by said storage means.

* * * * *